United States Patent [19]
van Haag

[11] Patent Number: 5,769,771
[45] Date of Patent: Jun. 23, 1998

[54] CALENDER ROLLER FOR THE TREATMENT OF PAPER

[75] Inventor: Rolf van Haag, Kerken, Germany

[73] Assignee: Voith Sulzer Finishing GmbH, Krefeld, Germany

[21] Appl. No.: 618,852

[22] Filed: Mar. 20, 1996

[30] Foreign Application Priority Data

Mar. 27, 1995 [DE] Germany ................. 195 11 153.2

[51] Int. Cl.[6] ............................................. B23P 15/00
[52] U.S. Cl. ......................... 492/50; 492/39; 492/47; 492/56
[58] Field of Search ......................... 492/38, 39, 47, 492/45, 56, 50

[56] References Cited

U.S. PATENT DOCUMENTS

| | | |
|---|---|---|
| 612,910 | 10/1898 | Moran et al. . |
| 2,727,280 | 12/1955 | Waite .......................................... 492/45 |
| 4,716,637 | 1/1988 | McIntosh et al. ......................... 492/39 |

FOREIGN PATENT DOCUMENTS

| | | |
|---|---|---|
| 0 363 887 | 4/1990 | European Pat. Off. . |
| 1 229 548 | 12/1966 | Germany . |
| 1 807 331 | 6/1970 | Germany . |
| 6-58322 | 3/1994 | Japan . |
| 2 100 390 | 12/1982 | United Kingdom . |

*Primary Examiner*—Irene Cuda
*Attorney, Agent, or Firm*—Darby & Darby

[57] ABSTRACT

A calender roller for treating paper includes at least one roller having flanges disposed at both axial ends of the roller. Each of the flanges is formed in conjunction with a bearing journal. An exterior axial surface of the flanges include a plurality of axially projecting deflection bodies. A jacket includes a thin-walled tube and a layer of fiber-reinforced plastic, which covers the exterior surface of the flanges and a circumference of the tube. The fiber-reinforced plastic has fiber rovings which are wound onto the circumference of the tube and which, as a result of being deflected by the deflection bodies, also extend across the exterior axial surfaces of the flanges.

10 Claims, 1 Drawing Sheet

CALENDER ROLLER FOR THE TREATMENT OF PAPER

BACKGROUND OF THE INVENTION

1. Field of the Invention

The present invention relates to calender rollers, and more particularly, to a calender roller for the treatment of paper which utilizes a fiber-reinforced plastic having fibers which extend around both the circumference and the axial ends of the roller to provide increased strength at a relatively low weight.

2. Discussion of the Related Art

From EP 0 363 887 A2, a roller having bearing journals at its axial ends is known. The roller has a jacket made of fiber-reinforced plastic. The roller has flanges on both axial ends, which flanges support the bearing journals. This type of roller is suitable for use not only for the manufacture of paper, but also as a transport roller, guide roller or pressure roller for the treatment of films, foils, paper, textiles and other similar items. The jacket is comprised of several layers in which the carbon fiber rovings are laid with different pitches, which results in a comparatively light weight roller. To form the roller, the flanges, which support the bearing journals, are inserted into the jacket at both ends of the roller. However, problems have arisen in attempts to fasten the flange and the jacket securely together.

GB 21 00 390 A discloses a roller for transporting radiation-sensitive material, such as x-ray films. Therefore, the roller is very small relative to a calender roller. The roller is comprised of a tube that is surrounded by a plastic layer which also extends over each end of the tube. The plastic layer contacts a flange which supports a bearing journal.

SUMMARY OF THE INVENTION

Accordingly, it is an object of the present invention to provide a roller which provides increased stability at a relatively low weight. The roller has flanges disposed at both axial ends of the roller.

The low weight is possible because only bearing journals are used, as opposed to a conventional shaft which extends through the roller. In addition, a jacket preferably comprises a thin walled metal tube and a cylindrical layer that is made of a fiber-reinforced epoxy resin. Therefore, the jacket includes fiber-reinforced plastic which is lighter than a conventional jacket made of metal. A relatively low weight roller of this type is particularly well-suited for calenders in the treatment of paper, in which a number of rollers are stacked one above the other. The load characteristic curve of this type of calender is steeper because of the use of a lighter weight roller. The line loads in the working nips, which lie one above the other and which are formed by one hard roller and one soft roller, are significantly higher than in the prior art.

Increased stability is achieved because the fiber rovings of the fiber-reinforcement are placed not only on the circumference of the thin-walled tube, but also over the axial ends of the flanges. Additionally, a simplified winding procedure may be used, which is limited to the length of the calender roller, so that the layer of the fiber-reinforced plastic is produced with a substantially uniform thickness.

The bearing journals are formed in conjunction with the flanges and in a preferred embodiment the bearing journals are integral with the flanges. Therefore, the bearing journals are securely fastened to the calender roller by the flanges. The flanges are fixedly held to the tube by the fiber-reinforced plastic layer.

The flanges are preferably placed with their inner axial ends disposed against the axial ends of the tube. This structural arrangement creates an especially secure fastening of the flanges to the tubes because the flanges are specifically placed with their ends at the ends of the tube and these joining surfaces are pressed together so that they will be securely held together after the outer plastic layer section has hardened.

The rollers include a plurality of parallel axially projecting pins attached to the axial ends of the flanges. These pins help create the layer of fiber-reinforced plastic on the axial end.

The fibers are preferably carbon fibers, which results in increased stability and reduced weight.

The plastic is preferably an epoxy resin, which also provides the layer with increased stability and relatively low weight.

The thin-walled tube is preferably made of steel. Despite the use of a relatively small wall thickness, a steel tube still contributes substantially to the overall stability. However, other metals, such as aluminum, may also be used.

In an alternate embodiment, the interior of the tube has a lightweight support structure which allows a large part of the inner cavity to be hollow. The support structure increases the total weight by an insignificant amount, but substantially increases the stability of the roller. As a result, the rollers can either be more heavily loaded or a tube with an even smaller wall thickness can be used.

In the simplest case, the lightweight support structure includes support disks. These include, for example, flat circular disks made of metal which are inserted into the cavity of the tube, perpendicular to the axis.

The jacket preferably further comprises a covering made of a flexible material. As a result, the layer of fiber-reinforced plastic forms the load-bearing portion of the jacket, while the covering is used to provide flexibility.

The additional covering is preferably made of silicone rubber, which has wear characteristics that ensure a smooth surface which is desirable for the treatment of paper.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENT

Figure 1:
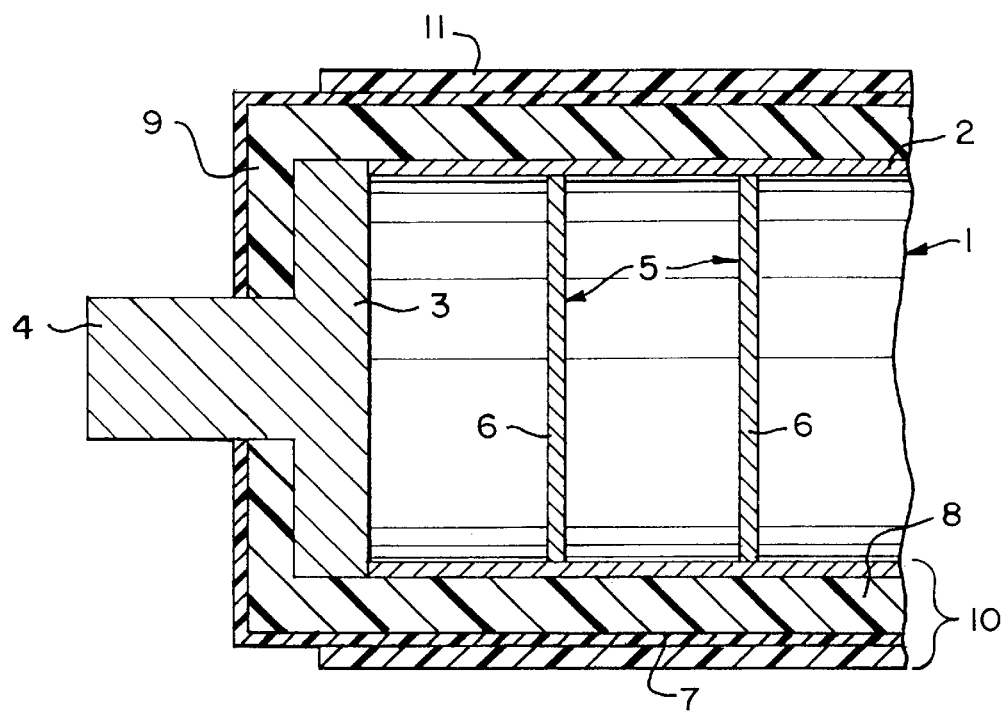
FIG. 1 is a longitudinal partial sectional view through an end section of the preferred roller in accordance with the present invention.

Referring now to FIG. 1, the roller according to the present invention is illustrated. The roller includes a core 1, which comprises a thin-walled steel tube 2 fastened to a flange 3. Flange 3 is formed in conjunction with a bearing journal 4. In a preferred embodiment, flange 3 is formed integrally with a bearing journal 4. The core may include a lightweight support structure 5, which preferably comprises sheet metal disks 6 that are positioned perpendicularly with respect to the axis of the roller. It is to be understood that the use of the lightweight support structure 5 is optional and is primarily to be used with heavy loads and/or long rollers. It is to be further understood that the roller has a flange disposed at each axial end of the roller, although for the sake of clarity in the drawings figures, only one axial end of the roller is illustrated.

A layer 7, preferably comprised of fiber-reinforced epoxy resin, extends along a first cylindrical layer section 8 disposed about the circumference of the core 1 and along a second disk-like layer section 9 disposed axially outside of and over the exterior axial end of the flange 3. Layer section 9 has approximately the same thickness as layer section 8. A covering 11, made of a flexible material, such as silicone rubber, is placed around layer 7. Tube 2, layer section 8 and covering 11 form a jacket 10 of the roller.

Tube 2 preferably has a thickness of 1.5 mm. Layer 7, which is made of fiber-reinforced epoxy resin, has a thickness of 10 mm, and the covering 11, which is made of silicone rubber, has a thickness of 3 mm. In addition, the modulus of elasticity of layer 7 is preferably 6500, and flexible covering 11 has a shore D hardness of 90.

Figure 2:
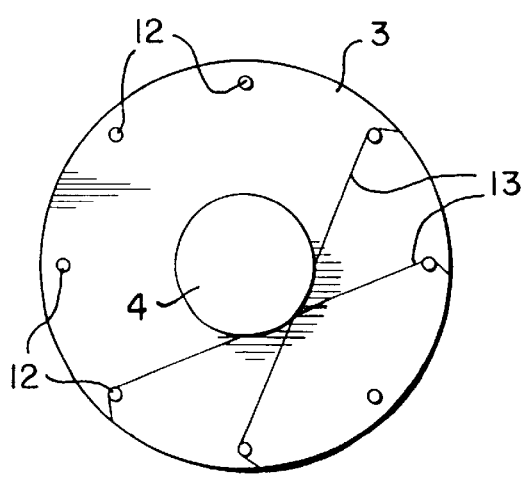
FIG. 2 is an end view of the core of the preferred roller in accordance with the present invention.
Figure 3:
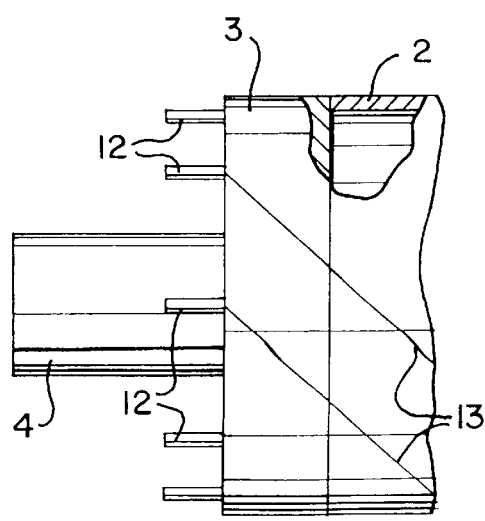
FIG. 3 is a side view of the core of the preferred roller in accordance with the present invention.

Referring now to FIGS. 2 and 3, flange 3 has a plurality of deflection bodies 12 disposed on its outer axial end. The deflection bodies are preferably axially projecting pins. During manufacture, fiber rovings 13 are wound on the circumference of the tube 2 with a predetermined pitch. The rovings 13 are deflected about the axial ends of the flange 3 by one of the deflection bodies 12 (i.e., the pin). The roving is then directed back onto the circumference of the roller by means of a second deflection body 12 (i.e., a second pin).

While the embodiment of the invention shown and described is fully capable of achieving the results desired, it is to be understood that this embodiment has been shown and described for purposes of illustration only and not for purposes of limitation. Other variations in the form and details that occur to those skilled in the art and which are within the spirit and scope of the invention are not specifically addressed. Therefore, the invention is limited only by the appended claims.

What is claimed is:

1. A calender roller for the treatment of paper, comprising:

a thin-walled tube having an outer circumference, a first axial end and a second axial end;

a first flange disposed adjacent to said first axial end of said tube, a second flange disposed adjacent to said second axial end of said tube, each of said first flange and said second flange being formed in conjunction with a bearing journal;

a plurality of deflection bodies projecting from an exterior axial surface of each of said flanges; and a layer of fiber-reinforced plastic covering said tube circumference and said exterior axial surfaces of said flanges, said fiber-reinforced plastic having fiber rovings which are wound onto the circumference of said tube and are disposed across said exterior axial surfaces of said flanges and being held in position with respect to said exterior axial surfaces by said deflection bodies.

2. The roller of claim 1, wherein an interior axial surface of each of said flanges is positioned against each of said axial ends of said tube.

3. The roller of claim 2, wherein said deflection bodies are parallel axially projecting pins that are attached to said exterior surfaces of said flanges.

4. The roller of claim 1, wherein said fiber rovings are carbon fibers.

5. The roller of claim 1, wherein said plastic is an epoxy resin.

6. The roller of claim 1, wherein said tube is made of steel.

7. The roller of claim 1, wherein the interior of said tube includes a support structure.

8. The roller of claim 7, wherein said support structure includes a plurality of support disks.

9. The roller of claim 1, further comprising a covering made of a flexible material disposed about said layer of fiber-reinforced plastic.

10. The roller of claim 9, wherein said covering is made of silicone rubber.

* * * * *